United States Patent
Anderson et al.

(10) Patent No.: US 11,093,880 B2
(45) Date of Patent: Aug. 17, 2021

(54) PRIORITIZING WORKLOAD

(71) Applicant: INTERNATIONAL BUSINESS MACHINES CORPORATION, Armonk, NY (US)

(72) Inventors: Eric M. Anderson, Friendswood, TX (US); Robert A. Davis, Atlanta, GA (US); Christopher J. Dawson, Arlington, VA (US); Patricia Foley, Alvarado, TX (US)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 16/736,980

(22) Filed: Jan. 8, 2020

(65) Prior Publication Data
US 2020/0143307 A1 May 7, 2020

Related U.S. Application Data

(63) Continuation of application No. 14/548,522, filed on Nov. 20, 2014, now Pat. No. 10,552,777.

(51) Int. Cl.
*G06Q 10/06* (2012.01)
*G06Q 30/00* (2012.01)

(52) U.S. Cl.
CPC . *G06Q 10/06316* (2013.01); *G06Q 10/06398* (2013.01); *G06Q 30/016* (2013.01); *Y04S 10/50* (2013.01)

(58) Field of Classification Search
CPC ....... G06Q 10/06316; G06Q 10/06398; G06Q 30/016; H04L 41/5074

USPC ........................................................ 705/7.26
See application file for complete search history.

(56) References Cited

U.S. PATENT DOCUMENTS

| | | | |
|---|---|---|---|
| 7,509,671 B1 | 3/2009 | Bedell |
| 7,849,044 B2 | 12/2010 | Nelken |
| 8,527,317 B2 | 9/2013 | Haddad |
| 8,554,776 B1 | 10/2013 | Barak |
| 9,172,809 B1 | 10/2015 | Mockus |
| 2007/0100782 A1 | 5/2007 | Reed |
| 2008/0168453 A1 | 7/2008 | Hutson |
| 2008/0195614 A1 | 8/2008 | Lutz |
| 2009/0133027 A1 | 5/2009 | Gunning |
| 2013/0051239 A1 | 2/2013 | Meredith |
| 2013/0197967 A1 | 8/2013 | Pinto |
| 2014/0146961 A1 | 5/2014 | Ristock |
| 2015/0339594 A1 | 11/2015 | Gallo |
| 2016/0148143 A1 | 5/2016 | Anderson |

OTHER PUBLICATIONS

Friedman, Mark J.; List of IBM Patents or Patent Applications Treated as Related; Jan. 8, 2020; 1 page.

*Primary Examiner* — Johnna R Loftis
(74) *Attorney, Agent, or Firm* — Schmeiser, Olsen & Watts; Nicholas L. Cadmus

(57) ABSTRACT

A method and system for determining work ticket priority is provided. The method includes enabling a work ticket for a work assignment associated with an entity. The work ticket is assigned an initial priority value. Relevant data from multiple sources is associated with the work ticket and an updated priority value is requested. In response, multiple priority scores for the work ticket with respect to additional work tickets are published to an enterprise service bus (ESB) and an aggregate score for work ticket is calculated from the multiple priority scores.

16 Claims, 4 Drawing Sheets

PRIORITIZING WORKLOAD

CROSS REFERENCE TO RELATED APPLICATIONS

This application is a continuation application claiming priority to Ser. No. 14/548,522 filed Nov. 20, 2014, now U.S. Pat. No. 10,552,777 issued Feb. 4, 2020, the contents of which are hereby incorporated by reference.

FIELD

The present invention relates generally to a method for prioritizing a workload and in particular to a method and associated system for utilizing data from external sources for calculating aggregate priority scores with respect to work tickets.

BACKGROUND

Determining work related issues typically includes an inaccurate process with little flexibility. Assigning work items may include a complicated process that may be time consuming and require a large amount of resources. A typical work assignment system does not include an automated ability. Accordingly, there exists a need in the art to overcome at least some of the deficiencies and limitations described herein above.

SUMMARY

A first aspect of the invention provides a method comprising: enabling, by a computer processor of a work management system in response to a request from a requestor, a work ticket for a work assignment associated with an entity; assigning, by said computer processor, an initial priority value to the work ticket with respect to additional work tickets; associating in real time, by said computer processor, relevant data from multiple sources with the work ticket, wherein the relevant data is retrieved simultaneously in real time from data sources external from and internal to the work management system; requesting, by the computer processor, an updated priority value for the work ticket with respect to the additional work tickets; retrieving, by the computer processor, data indicating a chain of reporting authorities for the requestor and the entity; publishing, by the computer processor to an enterprise service bus (ESB), a priority score request associated with the updated priority value; simultaneously publishing to the ESB, by the computer processor in response to commands from multiple adapters on multiple repositories based on the publishing the priority score request, multiple priority scores for the work ticket with respect to the additional work tickets, wherein each adapter of the multiple adapters calculates at least one of the multiple priority scores; and calculating, by the computer processor from the multiple priority scores, an aggregate score for the work ticket with respect to the additional work tickets in accordance with the updated priority value for the work ticket.

A second aspect of the invention provides a work management computing system comprising a computer processor coupled to a computer-readable memory unit, the memory unit comprising instructions that when executed by the computer processor implements a method comprising: enabling, by the computer processor in response to a request from a requestor, a work ticket for a work assignment associated with an entity; assigning, by the computer processor, an initial priority value to the work ticket with respect to additional work tickets; associating in real time, by the computer processor, relevant data from multiple sources with the work ticket, wherein the relevant data is retrieved simultaneously in real time from data sources external from and internal to the work management system; requesting, by the computer processor, an updated priority value for the work ticket with respect to the additional work tickets; retrieving, by the computer processor, data indicating a chain of reporting authorities for the requestor and the entity; publishing, by the computer processor to an enterprise service bus (ESB), a priority score request associated with the updated priority value; simultaneously publishing to the ESB, by the computer processor in response to commands from multiple adapters on multiple repositories based on the publishing the priority score request, multiple priority scores for the work ticket with respect to the additional work tickets, wherein each adapter of the multiple adapters calculates at least one of the multiple priority scores; and calculating, by the computer processor from the multiple priority scores, an aggregate score for the work ticket with respect to the additional work tickets in accordance with the updated priority value for the work ticket.

A third aspect of the invention provides a computer program product, comprising a computer readable hardware storage device storing a computer readable program code, the computer readable program code comprising an algorithm that when executed by a computer processor of a work management computing system implements a method, the method comprising: enabling, by the computer processor in response to a request from a requestor, a work ticket for a work assignment associated with an entity; assigning, by the computer processor, an initial priority value to the work ticket with respect to additional work tickets; associating in real time, by the computer processor, relevant data from multiple sources with the work ticket, wherein the relevant data is retrieved simultaneously in real time from data sources external from and internal to the work management system; requesting, by the computer processor, an updated priority value for the work ticket with respect to the additional work tickets; retrieving, by the computer processor, data indicating a chain of reporting authorities for the requestor and the entity; publishing, by the computer processor to an enterprise service bus (ESB), a priority score request associated with the updated priority value; simultaneously publishing to the ESB, by the computer processor in response to commands from multiple adapters on multiple repositories based on the publishing the priority score request, multiple priority scores for the work ticket with respect to the additional work tickets, wherein each adapter of the multiple adapters calculates at least one of the multiple priority scores; and calculating, by the computer processor from the multiple priority scores, an aggregate score for the work ticket with respect to the additional work tickets in accordance with the updated priority value for the work ticket.

The present invention advantageously provides a simple method and associated system capable of determining work related issues.

DETAILED DESCRIPTION

Figure 1:
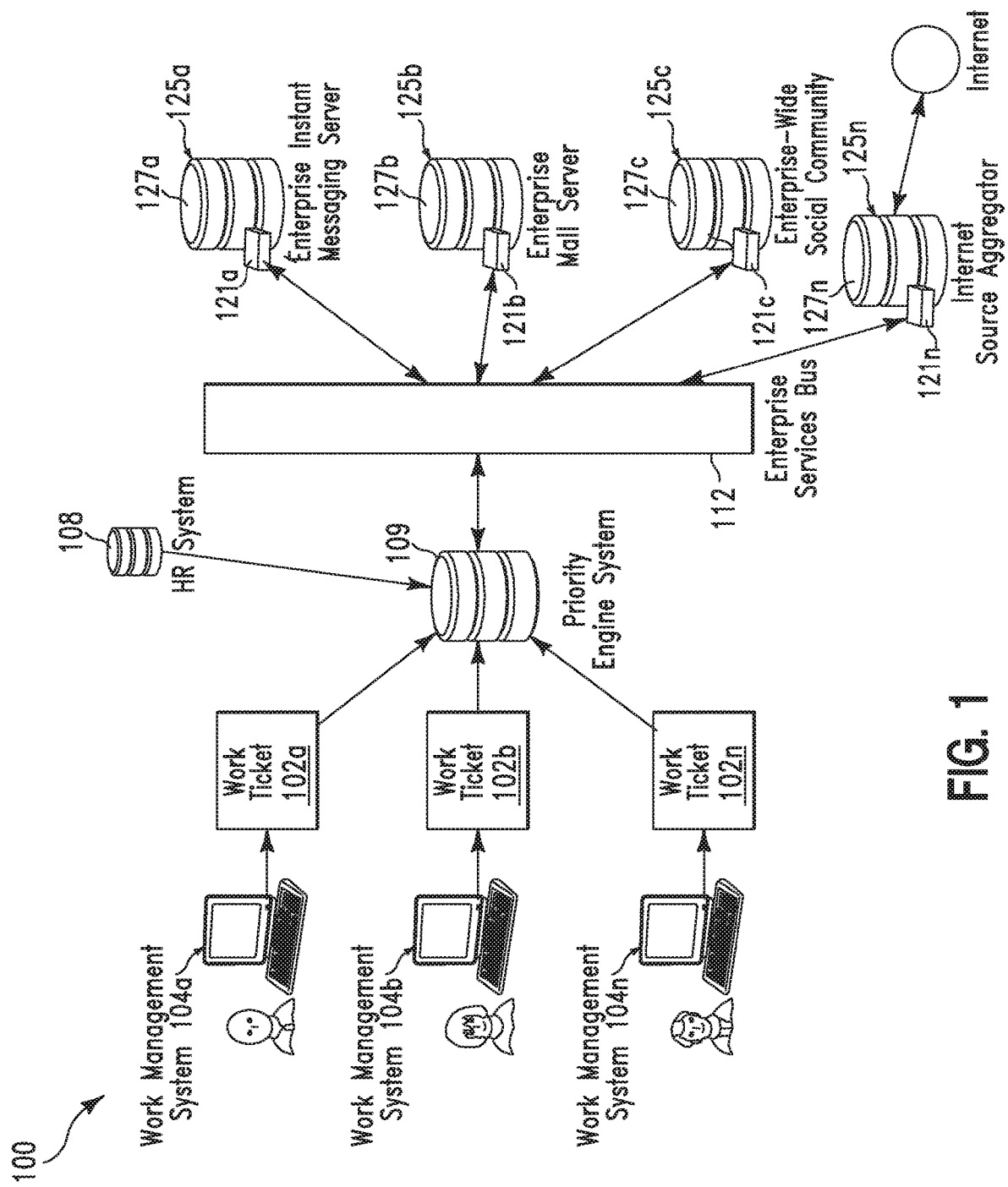
FIG. 1 illustrates a system for automatically assigning work to an individual based on aggregate priority scores, in accordance with embodiments of the present invention

FIG. 1 illustrates a system 100 for automatically assigning work (e.g., via a work ticket) to an individual based on aggregate priority scores, in accordance with embodiments of the present invention. System 100 enables a process for automatically prioritizing assigned work based upon an importance (of the work) to a governing enterprise (e.g., a company). A work assignee would not even need to know details associated with an importance level to the governing enterprise. Additionally, adapters (e.g., adapters 125a ... 125n) associated with repositories (e.g., repositories 125a ... 125n) are configured to provide priority scores based on, inter alia, private email exchanges, instant messaging conversations, etc.

In a typical given work queue, a given work item's priority is often determined by a person or process that initiates the work item. Work item priority may defined by specific policies and/or a "gut feel." When a prioritization policy is defined, the policy may fail to take into account unforeseen scenarios. Often, the unforeseen scenarios and effects are described via alternative channels or forums such as instant messaging conversations or urgent emails. Many times, messages or emails are unknown with respect to a work item assignee as the information may not have been passed down to the work item assignee him. Additionally, individuals involved with the messages or emails may be unable to contact the work item assignee to explain an impact of a related issue.

In such a situation, the work item assignee continues to prioritize his/her work based on an initial priority of the work item, when in fact, the work item comprises a higher urgency. Therefore, a work item assignee and associated business may be better served if a real-time priority (based upon relevant information in the enterprise) may be provided to the work item assignee via a work management system by a priority engine system.

System 100 of FIG. 1 includes work management systems 102a ... 102n connected through a priority engine system and an enterprise service bus (ESB) to a plurality of communication servers 125a ... 125n. A work management system comprises ticketing or work order computing system accessed by a user via a workstation. Priority engine system 109 comprises a device for collects priority requests from work management systems 102a ... 102n. The priority requests are published over ESB 112. Additionally, priority engine system 109 collects relative priority scores and provides an aggregate priority to work management systems 102a ... 102n. Each of communication servers 125a ... 125n comprises a repository (i.e., a respective one of repositories 127a ... 127n) and an adapter (i.e., a respective one of adapters 121a ... 121n). A repository is defined herein as an external (to ESB 112 and priority engine system 109) communication server/database (e.g., an instant messaging server, an email server, a social community server, an Internet source server, etc.). Each of repositories 127a ... 127n comprises a custom adapter for capturing a relative score request and calculating a relative score based on information in request and associated information in a given repository. The adapter then publishes the relative score over the ESB. Each adapter continues to periodically calculate and republish a score against a repository until the request expires. An adapter (e.g., adapters 121a ... 121n) is defined herein as a unique device (i.e., unique to each repository of a communication server) configured to calculate a priority score. An ESB 112 is defined herein software that runs on an independent communication/network hardware device. ESB 112 comprises a messaging service that allows applications and services to publish and subscribe to differing types of messages and associated device/servers.

System 100 enables a prioritization method that includes entering a user prioritized work item(s) into a work management system (i.e., one of work management systems 104a ... 104n). Details of the work item(s) are provided by the work management system to priority engine system 109 via an associated one of work tickets 102a ... 102n. Additionally, a priority for the work item is requested. In response, priority engine system 109 retrieves a report-to chain of a requestor from a human resources system 108 and publishes a priority score request to ESB 112. In response to the published request, adapters 121a ... 121n calculate priorities based on the published request and associated information within a respective repository. Each of adapters 121a ... 121n publishes a respective priority score over ESB 112. Priority engine system 109 retrieves the priority scores, calculates an aggregate score, and transmits the aggregate score to an associated work management system.

System 100 performs the aforementioned functions:
1. In near real-time.
2. Without exposing sensitive information to a work item assignee.
3. In accordance with a true impact to the business and/or enterprise.

System 100 enables a process for prioritizing work utilizing sources (e.g., communication servers 125a ... 125n) external to work a management system (e.g., work management systems 102a ... 102n). System 100 retrieves input data from multiple sources (available internal or external to the enterprise) utilizing priority engine system 109, ESB 112, and adapters 121a ... 121n. System 100 assigns priority values based on email conversations, instant messaging conversations, online forums, etc.

System 100 enables the following prioritization process algorithm:
1. A ticket (one of work tickets 102a ... 102n) is opened in an associated work management system (one of work management systems 104a ... 104n). The ticket is assigned an initial requestor priority.
2. The work management system provides relevant details (e.g., keywords, a requester, an assignee, etc.) to priority engine system 109. A priority for the ticket is requested.
3. Priority engine system 109 retrieves related information and a report-to chain of requester and assignee from HR system 108.
4. Priority engine system 109 publishes a priority score request to the ESB 112.
5. Each of adapters 121a ... 121n retrieves the priority score request and calculate an associated priority based on information in the request and information in an associated one of repositories 127a ... 127n
6. Each of adapters 121a ... 121n publishes a priority score over ESB 112.

7. The priority scores are gathered by priority engine system 109. In response, priority engine system 109 calculates an aggregate score provided back to an associated one of work management systems 104a . . . 104n.

The following implementation example 1 (executed by system 100) describes a first scenario associated with determining an aggregate priority score as follows:

Example 1

A work item is opened in a work management system. The work item describes a degradation of a supply chain service requiring investigation. A requester John T opens the work item and there is no information indication or a service outage. The requester reports an initial priority of 3 (i.e., low). In response, all relevant information of the work item is gathered. The relevant information includes work item categorization, a configuration item, a name of the original requester and the name of the person to whom the work item is assigned. The work management system transmits a relative score request to priority engine system. The priority engine system standardizes the work item details and assigns an ID to the request. Additionally, the priority engine system queries an HR system for a report-to chain of both the requester and assignee. The priority engine system publishes the request and expiration date/time over the ESB as follows:

| Relative Score Request | |
|---|---|
| ID | 938420194 |
| Expiration | 27 Feb. 2014 14:00 UTC |
| Category | Enterprise System |
| Configuration Item Description | Supply Chain Management System |
| Requester | John T |
| Requester Report-to-Chain | Brian C, Jane S, Bob M |
| Requester Department Name | Sales |
| Assignee | Ted J |
| Assignee Report-to-Chain | Kerry M, Jim R, Bob M |
| Assignee Department Name | Network Services |
| Customers Affected | ACME, Zayre |
| Keywords | Widgets, firewall |

In response, each adapter on each repository picks up the request. Each adapter executes a process to calculate a relative score. An instant messaging system adapter executes the process to calculate a priority. The instant messaging system adapter automatically locates an ongoing conversation between Jane S and Bob M. In the conversation, Jane and Bob are discussing a potentially serious impact of a supply chain management system with respect to an ACME customer. Due to the fact that Jane S and Bob M are managers, their conversation carries more weight than a conversation between two non-management employees. The priority is calculated by the following formula:

Relative score=(unique keyword hits)×(configuration item references)×(report-to-chain weight)

The priority is calculated as follows:

10=2×1×5

The instant messaging system adapter calculates a relative score of 10 and the relative score is published on the ESB. Enterprise social media community, server, and Internet aggregator adapters execute calculations. Each of the aforementioned adapters calculate scores of 3.1, 2.8 and 2.5, respectively. 5. The priority engine system collects all of the relative scores for the given request and calculates an aggregate score as follows:

| External System Name | Relative Priority Score | Weight/Multiplier | Score |
|---|---|---|---|
| Enterprise Mail Server | 2.8 | 1.2 | 3.36 |
| Enterprise Instant Messaging Server | 10 | 1.5 | 15 |
| Enterprise-Wide Social Community | 3.1 | 1 | 3.1 |
| Internet Source Aggregator | 2.5 | 1.3 | 3.25 |
| | | Aggregate Score | 24.71 |

The aggregate score is converted to an aggregate priority based on score ranges as follows:

| Score | Priority |
|---|---|
| 0.0-9.9 | 4 |
| 10-19.9 | 3 |
| 20-29.9 | 2 |
| 30 and higher | 1 |

In response, the priority engine system provides an aggregate priority of 2 to the work management system and the work management system displays the priority to the user.

The following implementation example 2 (executed by system 100) describes a second scenario (executed in addition to example 1) associated with determining an aggregate priority score as follows:

Example 2

The relative score request opened in example remains open and the enterprise repository adapters continue to calculate and transmit relative scores to the priority engine system. The relative scores remain constant until the enterprise mail server adapter finds an urgent email to Jim R from an email with a domain of zayre.com. The email describes the severe impact the supply chain service is having on Zayre's business and that the customer wishes to escalate.

The new priority is calculated by the following formula:

Relative score=(sender with customer email domain)+((number of "trigger" words such as "escalation" or "contract")×(report-to-chain weight))

The new priority is calculated as follows:

21=1+(2×10).

The priority engine system collects all of the relative scores for the given request and calculates an aggregate score as follows:

| External System Name | Relative score | Weight/Multiplier | Score |
|---|---|---|---|
| Enterprise Mail Server | 2.8 | 1.2 | 21 |
| Enterprise Instant Messaging Server | 10 | 1.5 | 15 |
| Enterprise-Wide Social Community | 3.1 | 1 | 3.1 |
| Internet Source Aggregator | 2.5 | 1.3 | 3.25 |
| | | Aggregate Score | 42.35 |

Based on the aforementioned calculations and tables, the aggregate score results in a aggregate priority of 1. The priority engine system registers a new priority and delivers the priority to the work management system.

Figure 2:
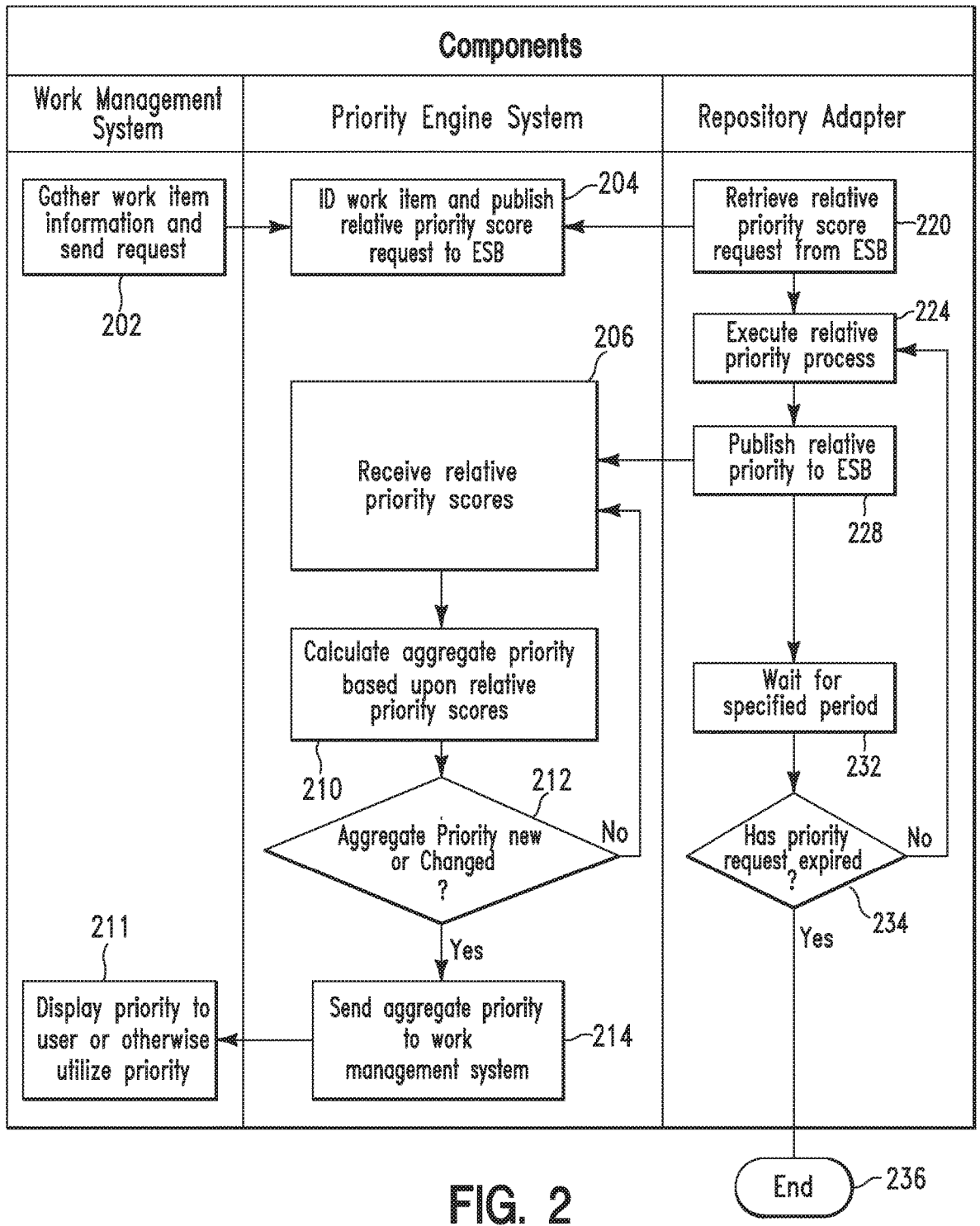
FIG. 2 illustrates a flowchart detailing a component view breakdown with respect to a process flow enabled by the system for automatically assigning work to an individual based on aggregate priority scores, in accordance with embodiments of the present invention.

FIG. 2 illustrates a flowchart detailing a component view breakdown with respect to a process flow enabled by system 100 of FIG. 1 for automatically assigning work to an individual based on aggregate priority scores, in accordance with embodiments of the present invention. In step 202, a work management system gathers work item information and transmits a request. In step 204, the work item is assigned an ID and an associated relative priority score request is published to an ESB. In step 220, the relative priority score request is retrieved (by a repository adapter) from the ESB. In step 224, a relative priority process is executed. In step 228, a relative priority is published to the ESB. Steps 206 and 232 are executed simultaneously.

In step 206, relative priority scores are received by the priority engine system from the repository adapter. In step 210, an aggregate priority score is calculated based on the relative priority scores. In step 212, it is determined if the aggregate priority score comprises a new score or has changed (i.e., from the initial priority). If the aggregate priority score does not comprise a new score or has not changed then step 206 is repeated. If the aggregate priority score comprises a new score or has changed then in step 214, the aggregate priority score is transmitted to the work management system and in step 218, the aggregate priority score is displayed or utilized.

In step 232, the request is disabled for a specified time period. In step 234, it is determined if the priority request has expired. If the priority request has not expired then step 224 is repeated. If the priority request has not expired then the process is terminate in step 236.

Figure 3:
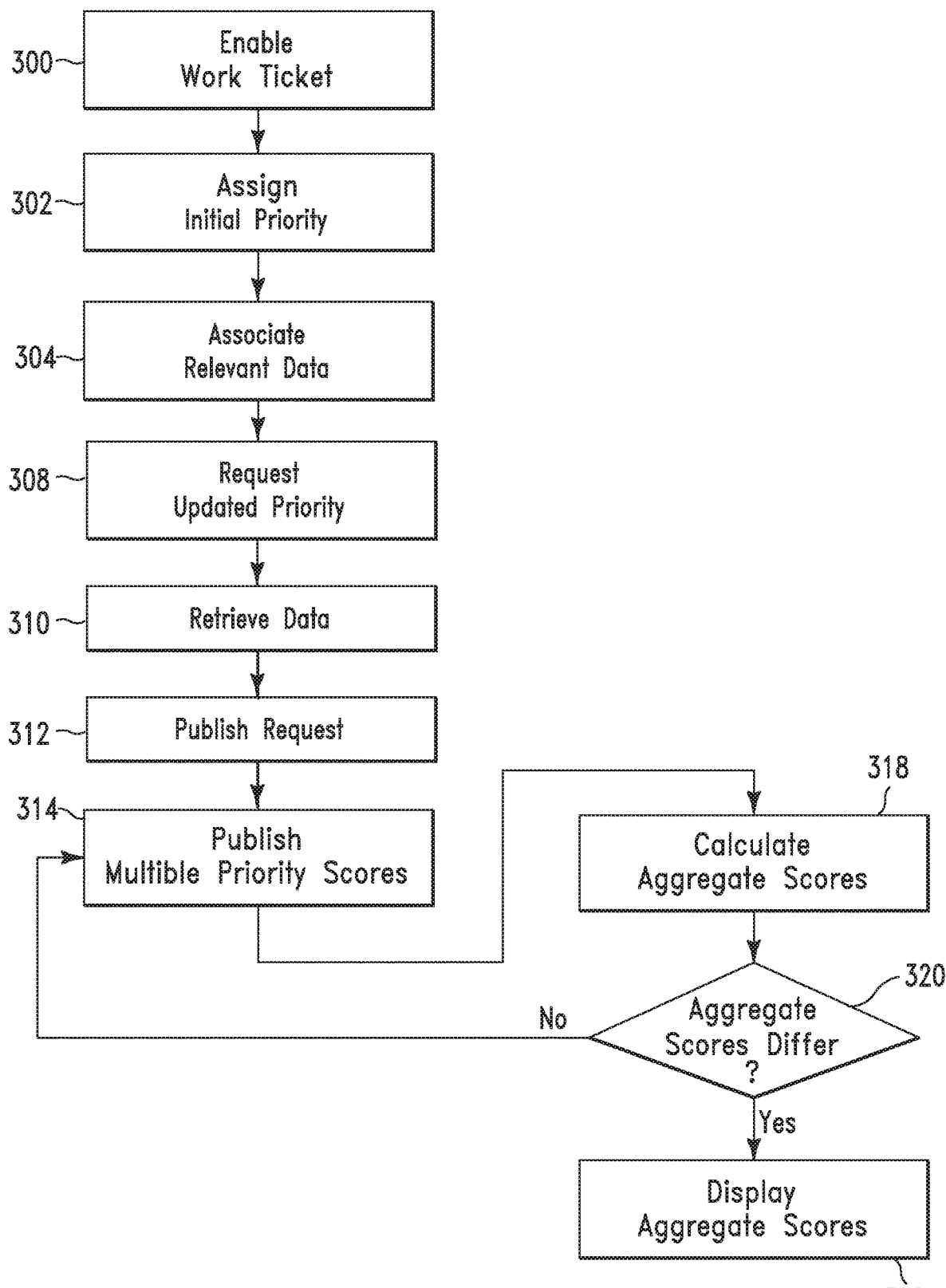
FIG. 3 illustrates an algorithm detailing a process flow enabled by the system of FIG. 1 for automatically assigning work to an individual based on aggregate priority scores, in accordance with embodiments of the present invention.

FIG. 3 illustrates an algorithm detailing a process flow enabled by system 100 of FIG. 1 for automatically assigning work to an individual based on aggregate priority scores, in accordance with embodiments of the present invention. Each of the steps in the algorithm of FIG. 3 may be enabled and executed in any order by a computer processor executing computer code. In step 300, a work ticket for a work assignment associated with an entity is enabled (in a work management system) in response to a request from a requestor. In step 302, an initial priority value is assigned to the work ticket with respect to additional work tickets. In step 304, relevant data from multiple sources is associated (in real time) with the work ticket. The relevant data is retrieved simultaneously in real time from data sources external from and internal to the work management system. In step 308, an updated priority value for the work ticket with respect to additional work tickets is requested. In step 310, data indicating a chain of reporting authorities for the requestor and entity is retrieved. In step 312, a priority score request associated with the updated priority value is published to an enterprise service bus (ESB). In step 314, multiple priority scores for the work ticket with respect to the additional work tickets are simultaneously published to the ESB in response to commands from multiple adapters on multiple repositories based on publishing the priority score request. Each adapter calculates at least one of the multiple priority scores. In step 318, an aggregate score for the work ticket is calculated from the multiple priority scores in accordance with the updated priority value for the work ticket. In step 320, it is determined if the aggregate priority score comprises a new score or has changed (i.e., from the initial priority score). If the aggregate priority score does not comprise a new score or has not changed then step 314 is repeated. If the aggregate priority score comprises a new score or has changed then in step 322, the aggregate priority score is transmitted to the work management system and displayed for a user.

Figure 4:
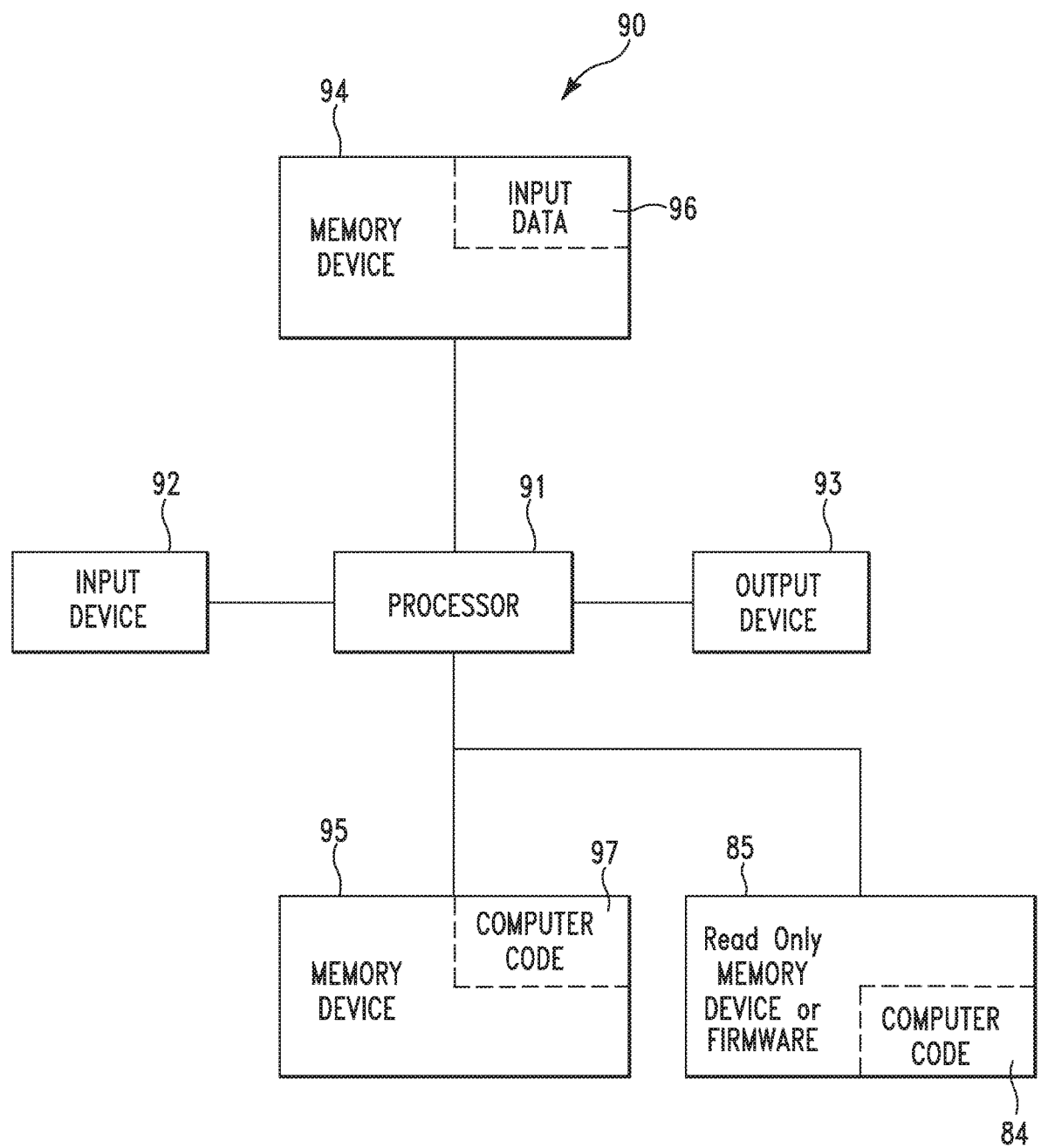
FIG. 4 illustrates a computer system used by the system of FIG. 1 for automatically assigning work to an individual based on aggregate priority scores, in accordance with embodiments of the present invention.

FIG. 4 illustrates a computer system 90 (e.g., priority engine system 109, ESB 112, or servers 125a . . . 125n of FIG. 1) for automatically assigning work to an individual based on aggregate priority scores, in accordance with embodiments of the present invention.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 4 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 2 and 3) for automatically assigning work to an individual based on aggregate priority scores. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices Such as read only memory device 96) may include the algorithms of FIGS. 2 and 3 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including the algorithms of FIGS. 2-3) may be stored on a static, nonremovable, read-only storage medium such as a Read-Only Memory (ROM) device 85, or may be accessed by processor 103 directly from such a static, nonremovable, read-only medium 85. Similarly, in some embodiments, stored computer program code 84 may be stored as computer-readable firmware 85, or may be accessed by processor 103 directly from such firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to automatically assign work to an individual based on aggregate priority scores. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method for automatically assigning work to an individual based on aggregate priority scores. In another embodiment, the invention provides a business method that performs the process steps of the invention on a subscription, advertising, and/or fee basis. That is, a service supplier, such as a Solution Integrator, could offer to enable a process for automatically assigning work to an individual based on aggregate priority scores. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A server workload prioritization method comprising:
    enabling, by a computer processor of a special purpose hardware based work management system in response to a request from a requestor, a work ticket for a work assignment associated with an entity and service outage issues associated with a work item, wherein said work management system is connected through a priority engine hardware device, an enterprise service bus (ESB), and a plurality of hardware adapter devices to a plurality of repository servers, wherein said ESB comprises specialized software running on an independent communication and network hardware device and wherein each hardware adapter device comprises a unique device customized for an associated repository server of said plurality of repository servers;
    assigning, by said computer processor, an initial priority value to said work ticket with respect to additional work tickets;
    requesting, by said computer processor, an updated priority value for said work ticket with respect to said additional work tickets;
    enabling, by said processor via said ESB, an application subscription to differing types of messages and associated device and servers;
    retrieving, by said processor from an HR system, a report chain associated with said requester and an assignee;
    publishing, by said computer processor to said ESB in response to said enabling and said report chain, a priority score request associated with said updated priority value;
    simultaneously publishing, in real time, to said ESB, by said computer processor in response to commands from said plurality of hardware adapter devices on said plurality of repository servers based on said publishing said priority score request, multiple priority scores for said work ticket with respect to said additional work tickets, wherein each adapter of said multiple adapters calculates at least one of said multiple priority scores;
    automatically locating, by said computer processor via said plurality of hardware adapter devices, multiple electronic communication messages associated with said service outage issues, wherein said multiple electronic communication messages are being transmitted between said plurality of repository servers comprising electronic circuitry, and wherein said electronic circuitry comprises a programmable logic array utilizing state information of specialized firmware program code configured to execute said specialized software for personalizing said electronic circuitry for performing said server workload prioritization method;
    calculating, by said computer processor from said multiple priority scores and based on said multiple electronic communication messages, an aggregate score for said work ticket with respect to said additional work tickets in accordance with said updated priority value for said work ticket;
    automatically prioritizing in real time, by said computer processor based on said aggregate score, said work item associated with said plurality of repository servers;
    initiating, by a work assignee in response to said automatically prioritizing by said computer processor, said work item associated with accounting for said service outage; and
    deploying, integrating, and maintaining, by said computing system based on execution of firmware instructions with respect to said work item, said plurality of repository servers, said electronic circuitry, and said specialized software resulting in accounting for any unforeseen scenarios associated with said work item of said plurality of repository servers.

2. The method of claim 1, wherein relevant data associated with said work ticket is retrieved simultaneously in real time from data sources external from and internal to said work management system.

3. The method of claim 1, further comprising:
    determining, by said computer processor, if said aggregate score indicates a differing priority indicated by said initial priority value.

4. The method of claim 3, wherein said results of said determining indicate that said aggregate score indicates said differing priority, and wherein said method further comprises:
    displaying, by said computer processor, said aggregate score.

5. The method of claim 3, wherein said results of said determining indicate that said aggregate score indicates a same priority as said initial priority, and wherein said method further comprises:
    simultaneously publishing to said ESB, by said computer processor in response to additional commands from additional multiple adapters on additional multiple repositories based on said publishing said priority score request, additional multiple priority scores for said work ticket with respect to said additional work tickets, wherein each adapter of said additional multiple adapters calculates at least one of said additional multiple priority scores; and
    calculating, by said computer processor from additional multiple priority scores, an updated aggregate score for said work ticket with respect to said additional work tickets in accordance with said updated priority value for said work ticket.

6. The method of claim 1, further comprising:
    periodically recalculating, by said computer processor from said multiple priority scores and additional priority scores, updated aggregate scores for said work ticket with respect to said additional work tickets in accordance with said updated priority value for said work ticket.

7. The method of claim 1, further comprising:
providing at least one support service for at least one of creating, integrating, hosting, maintaining, and deploying computer-readable code in the computing system, said code being executed by the computer processor to implement: said enabling, said assigning, said requesting, said retrieving, said publishing, and said calculating.

8. A special purpose hardware based work management computing system comprising a computer processor coupled to a computer-readable memory unit, said memory unit comprising instructions that when executed by the computer processor implements a server workload prioritization method comprising:
enabling, by said computer processor in response to a request from a requestor, a work ticket for a work assignment associated with an entity and service outage issues associated with a work item, wherein said work management system is connected through a priority engine hardware device, an enterprise service bus (ESB), and a plurality of hardware adapter devices to a plurality of repository servers, wherein said ESB comprises specialized software running on an independent communication and network hardware device and wherein each hardware adapter device comprises a unique device customized for an associated repository server of said plurality of repository servers;
assigning, by said computer processor, an initial priority value to said work ticket with respect to additional work tickets;
requesting, by said computer processor, an updated priority value for said work ticket with respect to said additional work tickets;
enabling, by said processor via said ESB, an application subscription to differing types of messages and associated device and servers;
retrieving, by said processor from an HR system, a report chain associated with said requester and an assignee;
publishing, by said computer processor to said ESB in response to said enabling and said report chain, a priority score request associated with said updated priority value;
simultaneously publishing, in real time, to said ESB, by said computer processor in response to commands from said plurality of hardware adapter devices on said plurality of repository servers based on said publishing said priority score request, multiple priority scores for said work ticket with respect to said additional work tickets, wherein each adapter of said multiple adapters calculates at least one of said multiple priority scores;
automatically locating, by said computer processor via said plurality of hardware adapter devices, multiple electronic communication messages associated with said service outage issues, wherein said multiple electronic communication messages are being transmitted between said plurality of repository servers comprising electronic circuitry, and wherein said electronic circuitry comprises a programmable logic array utilizing state information of specialized firmware program code configured to execute said specialized software for personalizing said electronic circuitry for performing said server workload prioritization method;
calculating, by said computer processor from said multiple priority scores and based on said multiple electronic communication messages, an aggregate score for said work ticket with respect to said additional work tickets in accordance with said updated priority value for said work ticket;
automatically prioritizing in real time, by said computer processor based on said aggregate score, said work item associated with said plurality of repository servers;
initiating, by a work assignee in response to said automatically prioritizing by said computer processor, said work item associated with accounting for said service outage; and
deploying, integrating, and maintaining, by said computing system based on execution of firmware instructions with respect to said work item, said plurality of repository servers, said electronic circuitry, and said specialized software resulting in accounting for any unforeseen scenarios associated with said work item of said plurality of repository servers.

9. The work management computing system of claim 8, wherein relevant data associated with said work ticket is retrieved simultaneously in real time from data sources external from and internal to said work management system.

10. The work management computing system of claim 8, wherein said method further comprises:
determining, by said computer processor, if said aggregate score indicates a differing priority indicated by said initial priority value.

11. The work management computing system of claim 10, wherein said results of said determining indicate that said aggregate score indicates said differing priority, and wherein said method further comprises:
displaying, by said computer processor, said aggregate score.

12. The work management computing system of claim 10, wherein said results of said determining indicate that said aggregate score indicates a same priority as said initial priority, and wherein said method further comprises:
simultaneously publishing to said ESB, by said computer processor in response to additional commands from additional multiple adapters on additional multiple repositories based on said publishing said priority score request, additional multiple priority scores for said work ticket with respect to said additional work tickets, wherein each adapter of said additional multiple adapters calculates at least one of additional multiple priority scores; and
calculating, by said computer processor from additional multiple priority scores, an updated aggregate score for said work ticket with respect to said additional work tickets in accordance with said updated priority value for said work ticket.

13. The work management computing system of claim 8, wherein said method further comprises:
periodically recalculating, by said computer processor from said multiple priority scores and additional priority scores, updated aggregate scores for said work ticket with respect to said additional work tickets in accordance with said updated priority value for said work ticket.

14. A computer program product, comprising a computer readable hardware storage device storing a computer readable program code, said computer readable program code comprising an algorithm that when executed by a computer processor of a special purpose hardware based work management computing system implements a server workload prioritization method, said method comprising:

enabling, by said computer processor in response to a request from a requestor, a work ticket for a work assignment associated with an entity and service outage issues associated with a work item, wherein said work management system is connected through a priority engine hardware device, an enterprise service bus (ESB), and a plurality of hardware adapter devices to a plurality of repository servers, wherein said ESB comprises specialized software running on an independent communication and network hardware device and wherein each hardware adapter device comprises a unique device customized for an associated repository server of said plurality of repository servers;

assigning, by said computer processor, an initial priority value to said work ticket with respect to additional work tickets;

requesting, by said computer processor, an updated priority value for said work ticket with respect to said additional work tickets;

enabling, by said processor via said ESB, an application subscription to differing types of messages and associated device and servers;

retrieving, by said processor from an HR system, a report chain associated with said requester and an assignee;

publishing, by said computer processor to said ESB in response to said enabling and said report chain, a priority score request associated with said updated priority value;

simultaneously publishing, in real time, to said ESB, by said computer processor in response to commands from said plurality of hardware adapter devices on said plurality of repository servers based on said publishing said priority score request, multiple priority scores for said work ticket with respect to said additional work tickets, wherein each adapter of said multiple adapters calculates at least one of said multiple priority scores;

automatically locating, by said computer processor via said plurality of hardware adapter devices, multiple electronic communication messages associated with said service outage issues, wherein said multiple electronic communication messages are being transmitted between said plurality of repository servers comprising electronic circuitry, and wherein said electronic circuitry comprises a programmable logic array utilizing state information of specialized firmware program code configured to execute said specialized software for personalizing said electronic circuitry for performing said server workload prioritization method;

calculating, by said computer processor from said multiple priority scores and based on said multiple electronic communication messages, an aggregate score for said work ticket with respect to said additional work tickets in accordance with said updated priority value for said work ticket;

automatically prioritizing in real time, by said computer processor based on said aggregate score, said work item associated with said plurality of repository servers;

initiating, by a work assignee in response to said automatically prioritizing by said computer processor, said work item associated with accounting for said service outage; and deploying, integrating, and maintaining, by said computing system based on execution of firmware instructions with respect to said work item, said plurality of repository servers, said electronic circuitry, and said specialized software resulting in accounting for any unforeseen scenarios associated with said work item of said plurality of repository servers.

15. The computer program product of claim 14, wherein said method further comprises:

determining, by said computer processor, if said aggregate score indicates a differing priority indicated by said initial priority value.

16. The computer program product of claim 15, wherein said results of said determining indicate that said aggregate score indicates said differing priority, and wherein said method further comprises:

displaying, by said computer processor, said aggregate score.

\* \* \* \* \*